(12) United States Patent
Widegren

(10) Patent No.: US 7,322,203 B2
(45) Date of Patent: Jan. 29, 2008

(54) DEVICE FOR SUPPLYING PRECONDITIONED AIR TO AN AIRCRAFT ON THE GROUND

(75) Inventor: Michael Widegren, Oberursel (DE)

(73) Assignee: Ipalco B.V. (NL)

( * ) Notice: Subject to any disclaimer, the term of this patent is extended or adjusted under 35 U.S.C. 154(b) by 273 days.

(21) Appl. No.: 10/527,968

(22) PCT Filed: Sep. 15, 2003

(86) PCT No.: PCT/EP03/50625

§ 371 (c)(1),
(2), (4) Date: Oct. 5, 2005

(87) PCT Pub. No.: WO2004/024561

PCT Pub. Date: Mar. 25, 2004

(65) Prior Publication Data

US 2006/0123804 A1 Jun. 15, 2006

(30) Foreign Application Priority Data

Sep. 16, 2002 (LU) ........................................ 90967

(51) Int. Cl.
*F25D 17/06* (2006.01)
*F25B 9/00* (2006.01)

(52) U.S. Cl. ................................. 62/97; 62/172; 62/401
(58) Field of Classification Search .................... 62/86, 62/97, 236, 237, 239, 244, 401, 402, 448; 454/71, 119, 141
See application file for complete search history.

(56) References Cited

U.S. PATENT DOCUMENTS

| 2,585,570 | A | * | 2/1952 | Messinger et al. | ............ 62/402 |
| 2,930,205 | A | * | 3/1960 | Walker | ......................... 62/241 |
| 3,777,506 | A | * | 12/1973 | Hergatt et al. | ................. 62/237 |
| 4,209,993 | A | | 7/1980 | Rannenberg | |
| 4,251,994 | A | | 2/1981 | Reinhorn | |
| 4,272,967 | A | * | 6/1981 | White et al. | .................. 62/236 |
| 4,550,573 | A | * | 11/1985 | Rannenberg | ................. 62/172 |
| 4,632,019 | A | * | 12/1986 | Whiteman | .................... 454/76 |
| 5,031,690 | A | | 7/1991 | Anderson et al. | |
| 5,414,992 | A | * | 5/1995 | Glickstein | .................... 60/782 |

(Continued)

FOREIGN PATENT DOCUMENTS

EP 0 732 552 9/1996

(Continued)

*Primary Examiner*—Mohammad M. Ali
(74) *Attorney, Agent, or Firm*—Cantor Colburn LLP

(57) ABSTRACT

A device (10) for supplying preconditioned air to an aircraft on the ground, comprises a compressed air inlet (16) and a compressed air hose (34) having a first end connected to the compressed air inlet (16) and an opposite second end for connect to a remote, ground-based, compressed air unit. Expander means (14) are situated downstream of the compressed air inlet (16) for allowing the compressed air to expand to lower pressure and temperature. The device (10) further includes an ambient air inlet (24) and a mixing chamber (22) downstream of the expander means (14) and communicating with the ambient air inlet (24) wherein mixing of ambient air with the expanded, cold air is controlled in such a way as to elaborate preconditioned air at the desired temperature. A connection hose (28) has a first end in communication with said mixing chamber and a second end to be connected to an aircraft on the ground.

12 Claims, 2 Drawing Sheets

U.S. PATENT DOCUMENTS

| | | | |
|---|---|---|---|
| 5,704,218 A * | 1/1998 | Christians et al. | 62/172 |
| 5,732,560 A | 3/1998 | Thuresson et al. | |
| 5,967,461 A * | 10/1999 | Farrington | 244/118.5 |
| 6,006,537 A * | 12/1999 | Ersmambetov et al. | 62/401 |
| 6,216,981 B1 * | 4/2001 | Helm | 244/118.5 |
| 6,405,549 B1 * | 6/2002 | Baffes | 62/188 |
| 6,449,963 B1 * | 9/2002 | Ng et al. | 62/86 |

FOREIGN PATENT DOCUMENTS

| | | |
|---|---|---|
| GB | 772 473 | 4/1957 |
| GB | 1 467 681 | 3/1977 |
| JP | 2002 235961 | 8/2002 |
| SU | 473038 A * | 9/1975 |

* cited by examiner

DEVICE FOR SUPPLYING PRECONDITIONED AIR TO AN AIRCRAFT ON THE GROUND

FIELD OF THE INVENTION

The present invention generally relates to a device for supplying preconditioned air to an aircraft on the ground.

BACKGROUND OF THE INVENTION

During the time an aircraft is parked on the ground, the on board air conditioning system is generally turned off, whereas the high density of passengers, the interior lighting, the large number of windows, and the heavily insulated fuselage all contribute to raising the temperature of the cabin to uncomfortable levels. Therefore, preconditioned air is conventionally supplied to the aircraft directly into the cabin ventilation system. This may be done by connecting the aircraft either to a remote air conditioning unit, or to a portable air conditioning unit, which is towed close to the aircraft.

When connecting the aircraft to a remote ground-based air conditioning unit, a long hose is used to deliver the preconditioned air to the aircraft. Such a hose may be about 300 mm in diameter and 20 to 30 m in length. The hose is connected at one end to a connector provided on the exterior of the fuselage and communicating with the cabin ventilation system. At its other end, the hose is connected to a preconditioned air outlet of an independent air conditioning unit or of the airport air conditioning system, the preconditioned air outlet being situated about the airport terminal building, e.g. about a boarding gate. Unfortunately, the large dimensions of the hose involves large pressure drops and temperature variations. Furthermore, handling and storage of the hose when not in use is difficult.

The use of portable air conditioning units, as e.g. described in U.S. Pat. No. 5,031,690, that are towed close to the aircraft eliminates the problems associated with long hoses, since a short hose is then employed. In such a portable air conditioning unit, the cooling function is generally provided by a conventional vapour cycle refrigerant system, wherein the refrigerant compressor is driven by a diesel engine. Ambient air is sucked in the air conditioning unit and caused to flow through the evaporator of the refrigerant system so as to extract heat from this air. A blower is employed to supply the cool, preconditioned air to the aircraft at the desired flow conditions. A disadvantage of such air conditioning units is their relatively complex conception, since they include a refrigerant system and a diesel engine to operate the refrigerant system. Consequently, these units are relatively heavy and need to be either skid or truck mounted. In addition, exhaust gases from the diesel engine may be sucked into the air conditioning unit, which results in unpleasant odours for the passengers. Another disadvantage of such air conditioning units is that conventional vapour cycle refrigerant systems operate with CFCs, which are known for their harmful effect on the environment.

SUMMARY OF THE INVENTION

According to the present invention, a device for supplying preconditioned air to an aircraft on the ground comprises a compressed air inlet and expander means downstream of the compressed air inlet for allowing the compressed air to expand to lower temperature and pressure, thereby obtaining cold air. A mixing chamber, communicating with an ambient air inlet, is situated downstream of the expander means. In the mixing chamber, mixing of ambient air and cold, expanded air is controlled in such a way as to elaborate preconditioned air at the desired temperature. The device further comprises a connection hose, which has a first end in communication with the mixing chamber and a second end to be connected to a parked aircraft. It will be appreciated that the present device comprises a compressed air hose having a first end connected to the compressed air inlet and an opposite second end for connection to a remote, ground-based, compressed air unit. Hence, the compressed air used for the cooling effect is not produced within the device, but is supplied from a remote compressed air unit.

The present invention thus uses the so-called "air cycle" for producing preconditioned air. The use of air as a refrigerant is based on the principle that when a gas expands isentropically from a given temperature, its final temperature at the new pressure is much lower. In the present device, the resulting cold air is then directly used as a refrigerant in an open system. In other words, the cold air is not passed through a heat exchanger but introduced in the space to be cooled, i.e. the passenger cabin of the aircraft. It will also be noted that in the present device ambient air is mixed with the expanded cold air, which permits to increase the volume of preconditioned air that can be delivered to the aircraft and reduces the need on compressed air from the remote compressed air unit.

The cooling function in the present device is thus carried out by expanding compressed air, which is produced at a remote location (i.e. not in the device itself or in its vicinity). This eliminates the need—in the device itself—for a compressor and engine to drive the compressor. Consequently, the present device is lighter and of simpler conception than conventional portable air conditioning devices, such as e.g. that of U.S. Pat. No. 5,031,690. This also means that the present device can be designed as a self-contained air-conditioner of lightweight and reduced dimensions that can be easily manipulated on the parking area. Furthermore, the present device proves advantageous in that (1) the working fluid is air, which is free, safe and non toxic; (2) the need for environmentally damaging refrigerant such as CFC, HCFC and the like is eliminated; and (3) air cycle equipment is extremely reliable, thereby reducing maintenance costs.

As mentioned, the compressed air used in the present device comes from a remote compressed air unit, e.g. installed in or next to the airport building, and is supplied to the device via the compressed air hose and enters into the device through the compressed air inlet. Compressed air may be supplied to the device at relatively high pressure and e.g. ambient temperature. The compressed air hose may have a relatively small diameter, e.g. of about 30 mm. It is to be noted that possible variations in temperature and pressure of the compressed air during to the transfer in the compressed air hose do not affect the preconditioned air temperature, as it is possible to compensate for such variations during the expansion and/or mixing process in the device.

The present device preferably comprises a rolling support. Due to its light weight, the device can easily be pulled by a ground technician and does not need to be towed. Alternatively, the device could be truck mounted.

In order to supply preconditioned air to the aircraft with desired flow conditions, namely of pressure and velocity, flow control means are advantageously provided upstream of the connection hose. Such flow control means may e.g. comprise a centrifugal fan or an ejector, installed e.g. on the downstream side of the mixing chamber.

In a preferred embodiment, the expander means is a turbine expander, a rotary screw expander, or a displacement expander. The expansive flow of the compressed air through the expander thus results in a pressure and temperature drop with production of external work. This external work can e.g. be turned into electric energy by coupling the expander to an electric generator. Alternatively, the expander may be coupled to an ambient air compressor to increase the performance of the device by compressing ambient air and introducing it into the expander. This will increase the total airflow through the air caddy and reduce the need for ground based compressor capacity. It will also dry out the incoming air, so that cool dry air is introduced into the aircraft.

The expander means preferably opens into an expansion chamber, through which the expanded, cold air flows before entering the mixing chamber. The expander means and the expansion chamber are advantageously installed in an insulated casing. Depending on the efficiency of the insulation, the air in the expansion chamber may theoretically reach temperatures as low as −90° C. to −100° C. at atmospheric pressure. In the practice of the present invention, temperatures of −20° C. to −40° C. are generally obtained.

In the mixing chamber, the cold air is preferably mixed with a quantity of ambient air required to elaborate preconditioned air at the desired temperature.

In order to facilitate handling of the compressed air hose that connects the compressed air inlet to the remote compressed air unit, the device advantageously comprises a rotatable reel, for winding and unwinding the compressed air hose. The cable or hose assembly is wound up on the reel in such a way that it can be unwound from the second end.

In practice, when the device is not in use, it is stored nearby the compressed air unit to which the remote compressed air hose is connected, generally close to the terminal building, with the compressed air hose almost completely wound on the reel. When preconditioned air is to be supplied to a parked aircraft, the device is moved close to the aircraft, while the hose is reeled out.

In a preferred embodiment, the device includes two compressed air hoses, each connected to a compressed air inlet upstream of the expander means. This increases the cooling capacity of the device by increasing the quantities of air that can be supplied to the aircraft. In such a case, the device includes two rotatable reels, one for each compressed air hose.

The device further preferably comprises a gearbox connected to each reel hub and capable of rotating the reel, so as to wind or unwind the compressed air hose. Each gearbox may be coupled to an electric motor. The electric power needed for operating the electric motor shall advantageously be produced by a generator coupled to the rotary screw expander. Alternatively, rotation of the hose reels can be obtained by coupling each reel to a hydraulic or pneumatic motor. The reel movement is thus assisted, which simplifies the work of the ground technician and ensures a proper handling of the hoses.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
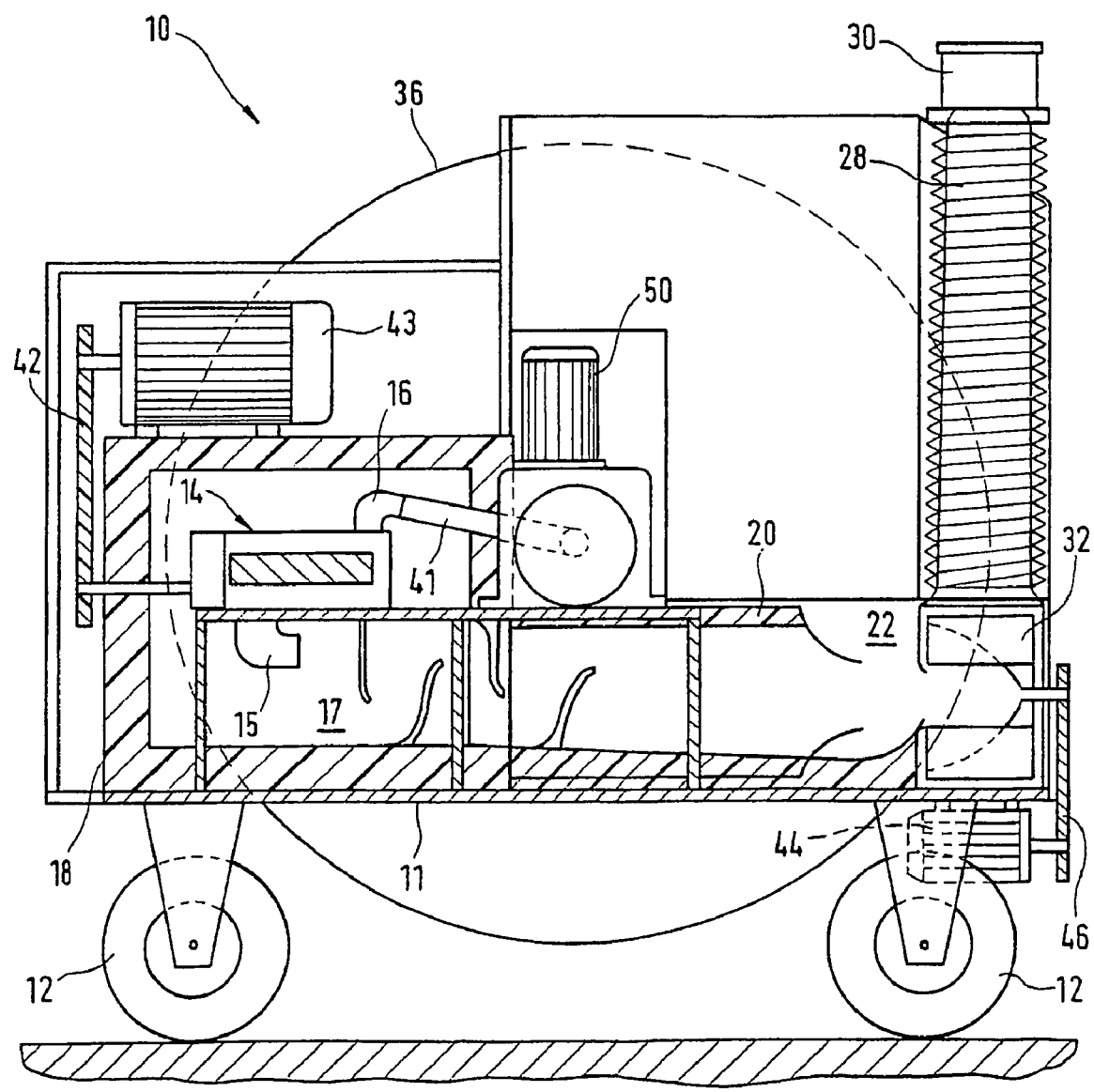
FIG. 1: is a partial vertical section view through a preferred embodiment of a device for supplying preconditioned air according to the present invention.
Figure 2:
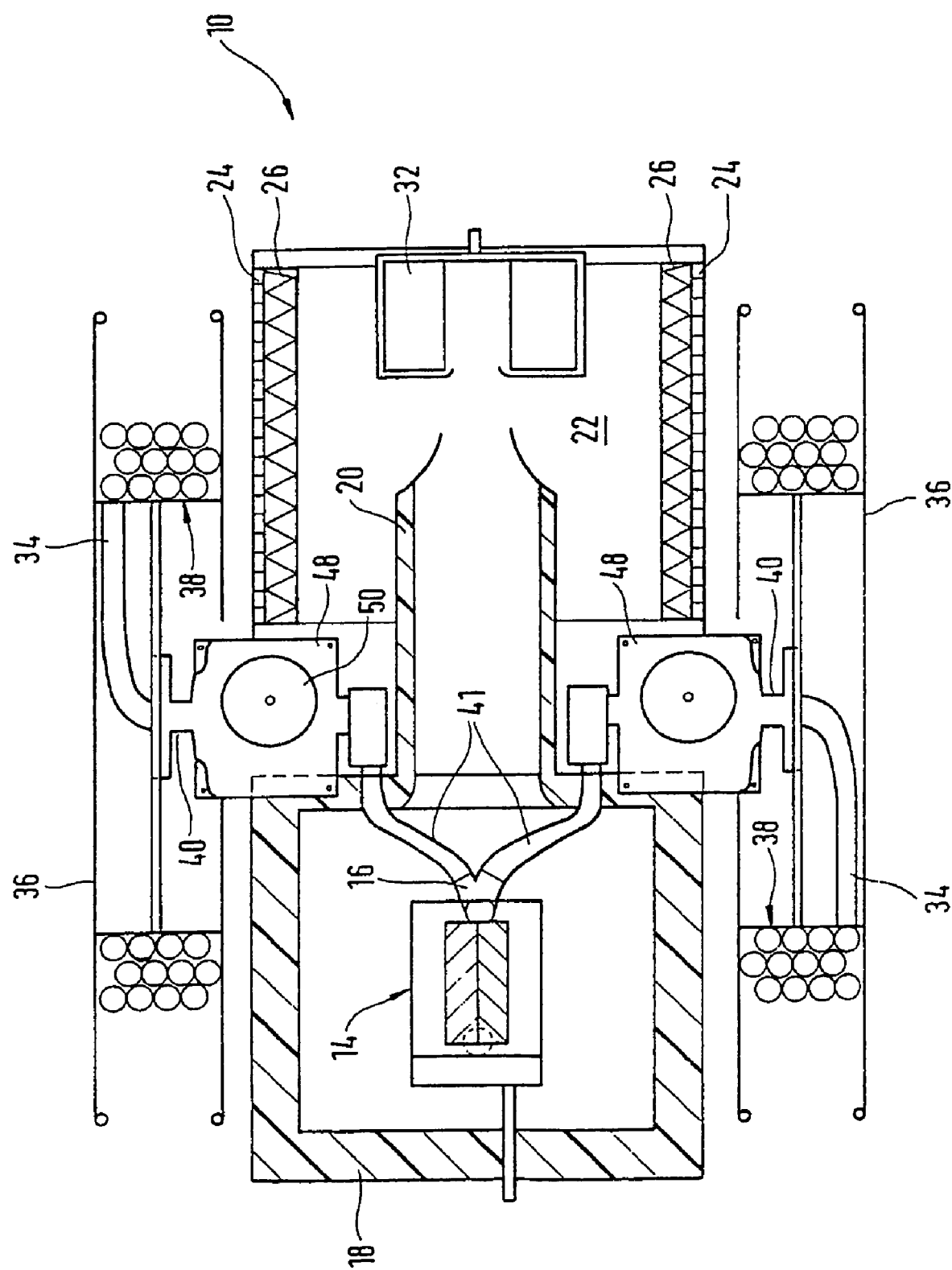
FIG. 2: is a partial section view of the device of FIG. 1.

A preferred embodiment of a device for supplying preconditioned air to an aircraft on the ground, generally indicated 10, is shown in FIG. 1. The present device 10 is adapted to be brought next to a parked aircraft, in order to supply the latter with preconditioned air, i.e. cool air, to maintain the passenger cabin at comfortable temperature levels. The device 10 therefore advantageously includes a rolling support 11, which comprises four wheels 12. Contrary to known portable air conditioning units, such as e.g. that described in U.S. Pat. No. 5,031,690, the cooling function of the present device 10 does not use a vapour cycle refrigerant system, but operates on the "air cycle" principle. This is based on the fact that when a gas expands isentropically from a given temperature, its final temperature at the new pressure is much lower.

Accordingly, the present device 10 includes an expander means, generally indicated 14, situated downstream of a compressed air inlet 16, through which compressed air is supplied to the device 10. By flowing through the expander means 14 the compressed air expands to lower temperature and pressure. As can be seen in FIG. 1, the expander means 14 has an outlet 15, which opens into an expansion chamber 17. In the present case, compressed air enters the expander means 14 at about ambient temperature and at a pressure of e.g. 3 to 10 bars or in the liquid state. The expansion chamber 17 and the expansion means 14 are preferably both mounted in an insulated casing 18. Depending on the quality of the insulation, the air temperature in the expansion chamber 17 may theoretically be as low as −90 to −100° C. at atmospheric pressure. In practice, temperatures of −40 to −20° C. are produced in the expansion chamber 17.

The cold air then flows from the expansion chamber 17, through a cold duct 20, into a mixing chamber 22 which communicates with a pair of ambient air inlets 24. Air filters 26 are preferably arranged in the ambient air inlets 24 to clean the ambient air entering the device 10. In the mixing chamber 22, the flow of ambient air is controlled in such a way as to mix the cold air with ambient air to elaborate preconditioned air at the desired temperature, generally of about +5° C.

A flexible connection hose 28 is associated with the present device 10 in order to deliver the preconditioned air to the parked aircraft. Hence, the connection hose 28 has a first end provided with a connector 30 adapted for connection with a preconditioned air inlet on the aircraft fuselage; and a second end in communication with the mixing chamber 22. The air inlet on the fuselage communicates with the aircraft air ventilation system, so that the preconditioned air may be directly introduced in the passenger cabin. Such a connection hose, shown in it rest position in FIG. 1, may e.g. be 2 to 3 m long (or more) and have a diameter of e.g. 300 mm.

It is to be noted that in present device 10 ambient air is mixed with the expanded cold air, which permits to increase the volume of preconditioned air that can be delivered to the aircraft and reduces the need on compressed air from the remote compressed air unit. Preferably, the mixing of the ambient air with expanded, cold air is carried out in such a way that the preconditioned air delivered to the aircraft consists of between 60 and 80%, more preferably 70%, of expanded cold air and the rest of ambient air.

Reference sign 32 indicates blower means, preferably a centrifugal blower, installed in the mixing chamber 22, on its downstream side. The blower means 32 allows to control the flow of preconditioned air in the connection hose 28. By adjusting the centrifugal blower 32 operating conditions it is thus possible to provide the aircraft with preconditioned air having desired pressure and velocity. Although not shown in the Figures, the device 10 shall advantageously comprise an electronic control unit and sensors to monitor and adjust the mixing temperature and blowing conditions according to desired set-points.

It will be noted that the present device advantageously comprises at least one compressed air hose through which compressed air is supplied to the device 10 from a remote compressed air unit. In the present embodiment, the device 10 preferably comprises a pair of flexible compressed air hoses 34 communicating with the compressed air inlet 16. Each of these hoses 34 thus has a first end 36 communicating with the air inlet 16 and an opposite, second end connected to the compressed air unit (not shown), which is e.g. situated next to airport terminal building. The compressed air hoses 34 may be e.g. from 20 to 40 m in length and have an inner diameter of e.g. 30 mm.

To facilitate handling of the hoses 34, the device 10 advantageously comprises a rotatable reel 36 associated with each hose 34, for winding and unwinding the latter. In the present embodiment, one reel 36 is mounted on each side of the device 10. Each hose 34 is wound on the reel 36 in such a way that it can be unwound from its second end, i.e. the end which is connected to the compressed air unit. As can be seen in the Figures, the first end of the compressed air hose 34 preferably passes through the support drum 38 of the reel 36 and communicates with the compressed air inlet 16 via a compressed air swivel joint 40 and piping 41.

In practice, when the device 10 is not in use, it is stored nearby the compressed air outlet of the compressed air unit to which the compressed air hoses 34 are connected, generally close to the terminal building, with the compressed air hoses 34 almost completely wound on the reels 36. The hoses 34 are thus kept out of the way of aircrafts or other vehicles. When preconditioned air is to be supplied to a parked aircraft, the device 10 is pulled by a ground technician next to the aircraft. As the technician pulls the device 10 towards the aircraft, the compressed air hoses 34 are reeled out. Hence, the hoses 34 are not dragged but laid on the ground as the device 10 is moved towards the aircraft, which avoids damaging the hoses 34 by abrasion.

It is to be noted that in the present embodiment, the expander means 14 preferably is a rotary screw expander, so that the expansion flow of the compressed air also results in the production of external work. This external work is turned into electrical energy by a generator 43 coupled to the turbine expander 14 by means of a belt 42.

The electricity produced by the generator 43 is then e.g. used to power an electric motor 44 coupled to the centrifugal blower 32 by means of a belt 46.

Furthermore, this electricity is advantageously used to assist the rotation of the reels 36. Accordingly, each reel 36 is provided with a gearbox 48 and an electric motor 50 powered by the generator 43. An automatic winding or unwinding of the hoses 34 can thus be effected, which simplifies the work of the ground staff.

Instead of the electric motors 50, it is possible to use compressed air motors, for driving the gearboxes 48 and the centrifugal blower 32.

It remains to be noted that the device may further comprise an ambient air compressor (booster compressor) driven by the rotary screw expander 14, to compress ambient air coming e.g. from the ambient air inlet and inject the compressed ambient air into the rotary screw expander 14. This increases the airflow through the device 10 and allows to reduce the moisture in ambient air.

The invention claimed is:

1. A device for supplying preconditioned air to an aircraft on the ground, said device comprising:
   a compressed air inlet;
   a compressed air hose having a first end connected to said compressed air inlet and an opposite second end for connection to a remote, ground-based, compressed air unit;
   expander means downstream of said compressed air inlet for allowing said compressed air to expand to lower pressure and temperature, thereby providing expanded, cold air;
   an ambient air inlet;
   a mixing chamber downstream of said expander means and communicating with said ambient air inlet, wherein mixing of ambient air with the expanded, cold air is controlled in such a way as to elaborate preconditioned air at the desired temperature; and
   a connection hose having a first end in communication with said mixing chamber and a second end to be connected to an aircraft on the ground.

2. The device according to claim 1, comprising flow control means upstream of said connection hose for providing a desired flow of preconditioned air through said connection hose.

3. The device according to claim 2, wherein said flow control means comprises a centrifugal blower or an ejector.

4. The device according to claim 1, wherein said expander means is one of a turbine expander, a rotary screw expander and a displacement expander.

5. The device according to claim 4 comprising an electric generator or an ambient air compressor coupled to said expander means.

6. The device according to claim 5, wherein said ambient air compressor has an outlet connected to said expander means.

7. The device according to claim 1, wherein said device comprises a rolling support.

8. The device according to claim 1, comprising two compressed air hoses having each a first end connected to a compressed air inlet and an opposite second end for connection to said ground-based, compressed air unit; and two rotatable reels for winding and unwinding said compressed air hoses.

9. The device according to claim 8, comprising an electric, hydraulic or pneumatic motor coupled to each rotatable reel via a gearbox.

10. The device according to claim 1, comprising an air filter downstream of said ambient air inlet.

11. The device according to claim 1, wherein said expander means opens into an expansion chamber.

12. The device according to claim 11, wherein said expander means and said expansion chamber are mounted in an insulated casing.

* * * * *